Oct. 25, 1938.    W. RUNGE    2,134,535
DISTANCE DETERMINING SYSTEM
Filed March 5, 1936
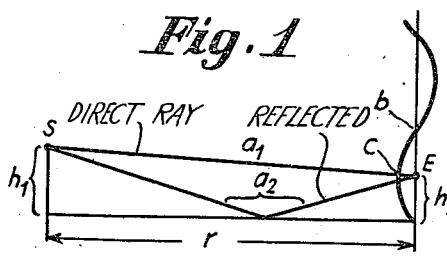
Fig. 1
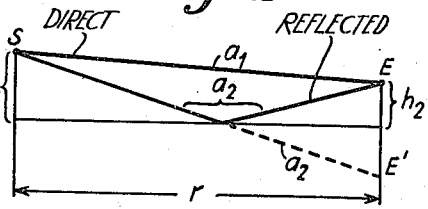
Fig. 2
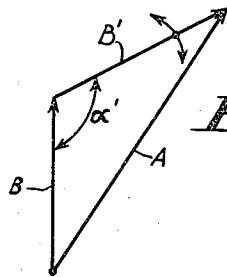
Fig. 3
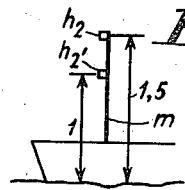
Fig. 4
Fig. 5
PLOT OF
$q^2 = \dfrac{\sin^2 1.5\alpha}{\sin^2 \alpha}$ = THE
SQUARE OF THE RATIO OF FIELD STRENGTHS FOR DIFFERENT VALUES OF ANGLE $\alpha$, WHEN ANTENNA HEIGHTS ARE IN RATIO OF 1.5:1
INVENTOR
WILHELM RUNGE
BY 
ATTORNEY Patented Oct. 25, 1938

2,134,535

UNITED STATES PATENT OFFICE 2,134,535

DISTANCE DETERMINING SYSTEM

Wilhelm Runge, Berlin, Germany, assignor to Telefunken Gesellschaft für Drahtlose Telegraphie m. b. H., Berlin, Germany, a corporation of Germany Application March 5, 1936, Serial No. 67,285
In Germany March 6, 1935

3 Claims. (Cl. 250—1)

The present invention relates to a system for determining the distance of a transmitter from the place of reception.

In determining the distance between a receiver and a transmitter, the value of the field intensity has been used. It is observed that the field intensity decreases with an increase in distance of the receiver from the transmitter. The result of the measurement obtained in this way depends to a high degree upon the sensitivity of the receiver, and upon the power of the transmitter. The transmission power and eventually the direction of radiation can be maintained reasonably constant, but it is difficult to maintain the sensitivity of a receiver constant within narrow limits especially if the threshold of response of the receiver is at a relatively low level.

The method according to this invention for determining the distance between the place of transmission and reception is based upon entirely different physical viewpoints. It is characterized in that the distance may be determined from the field intensity values which the transmitter, whose distance is to be determined, produces at the same or approximately the same place of reception at different heights above ground, or above sea level.

It was found that generally in case of very short waves, and also at all horizontally polarized waves, the field intensity is equal to zero at the ground surface, especially at sea level, while changing in sinusoidal fashion with the height. This phenomenon and the features of my invention may best be explained upon reference to the accompanying drawing in which Figures 1, 2 and 3 are diagrammatic showings of the usual paths of radio waves;

Fig. 4 shows an antenna system carried aboard a vessel; and

Fig. 5 shows a field intensity curve in relation to horizontal distances and altitudes.

Referring first to Fig. 1, a direct ray $a_1$ passes from transmitter S to receiver E and also a ray $a_2$, being horizontally polarized is totally reflected at the ground surface and its phase is reversed at reflection. The difference in the length of the paths of the two rays amounting to an even number of half waves causes extinction approximately at place $b$. At an odd number of half waves, addition, i. e., a maximum of the field intensity occurs for instance at the place $c$.

Assume that $h_1$ and $h_2$ are the heights above ground or sea level of transmitter antenna and receiver antenna and that $r$ designates the shortest distance between transmitter and receiver base. Then the path difference $d$ between the direct and reflected radiation, where $r$ is large as compared with $h_1 + h_2$, may be determined by the following equation for a definite point at the place of reception:

$$d = a_2 - a_1 = \frac{2h_1 h_2}{r}$$

This result can be easily derived according to the geometric methods shown in Figs. 2 and 3. Herein is E' the mirror image of a receiver E situated above the reflecting surface.

Fig. 3 shows a vector diagram of the field intensity A at the place of reception E. One of the vectors marked B represents the field intensity of a beam propagated along the line $a_1$ of Figs. 1 and 2. The other vector B' represents the field intensity of a reflected beam that has followed the course of the line $a_2$. From the path difference $d$ there results a phase displacement between the field intensities of the two vectors, the phase angle $\alpha'$ being a function of the signal wave length $\lambda$. Due to reflection of one of the beams, however, the phase angle $\alpha' \pm \pi$ will be considered, where $$\alpha' = \frac{2\pi d}{\lambda} \quad (1)$$

In Fig. 3 it is seen that when the path difference $d=0$, or when $\alpha'=0°$, the resultant $A=0$, since one of the vectors then opposes the other due to the reversal of phase of the reflected ray. It may also be seen from Fig. 3 that $$A^2 = 2B^2 (1 - \cos \alpha') \quad (2)$$

and letting $$\alpha = \frac{\alpha'}{2} \quad (3)$$

$$A = 2B \sin \alpha \quad (4)$$

In order that this equation may be utilized to measure the distance in a simple manner, at two receiving heights $h_2$, $h_2'$ having the ratio $p$, the relationship between the two field intensity values $A_1$ and $A_2$ is being measured. In forming the quotient there will be:

$$\frac{A_1}{A_2} = \frac{\sin p\alpha}{\sin \alpha} \quad (5)$$

It follows from Equation (5) however, that $\alpha$ is a function of $$\frac{A_1}{A_2}$$

with the parameter $p$, so that for a definite $p$ $$\alpha = f_p\left(\frac{A_1}{A_2}\right) \quad (6)$$

From the measured proportion between the field intensities and graphic representation of Equation (6), $d$ can be directly determined. From the definitions of $\alpha$ and $d$ previously given, the distance $r$ will be found thus:

$$r = \frac{2\pi h_1 h_2}{\alpha \lambda} \quad (7)$$

Since the detection of modulated signals in the receiver generally follows the square, the proportion between the volumes at the receiver output is not proportionate to the field intensities, but proportional to the square of the field intensities. Instead of using in the calculation the proportion between the field intensities it is thus more convenient to consider the square of the field intensity proportion. Equation (6) indicates that $\alpha$ is also a function of $$\left(\frac{A_1}{A_2}\right)^2$$

$$\alpha = f'\left(\frac{A_1}{A_2}\right)^2 \quad (8)$$

The determination of $r$ becomes especially simple when measuring the receiving volumes for two antenna heights $h_2$ and $h_2'$ whose quotient $p$ is known. Thus, for example, as shown in Fig. 4, $$p = \frac{h_2}{h_2'} = 1.5$$

the quotient of the received volume is thus determined. This quotient together with a plot of Equation (8) made for the particular value of $p$ used, permits direct reading of the value of $\alpha$ and hence, by Equation (7), the value of $r$.

The curve of Fig. 5 is a plot of Equation (8), when assuming that the received volumes vary as the square of the field strengths. This plot is made up for the particular value $p=1.5$. The curve is actually made by plotting Equation (5) squared. It should be noted that the ordinates are given in degrees. The value of $\alpha$ read from this chart should, of course, be converted into radians in order to be applicable in Equation (7). The abscissae represent the quotient ($q^2$) of the received volumes. If the measurements indicated, for instance, 2 volts as receiving volume at a receiver situated at a height $h_2=15$ m., and 1 volt at a receiver whose height $h_2'$ is 10 m., and if hereby the transmitter has a height of $h_1=10$ m. above the sea level, for instance, then $$q^2 = \frac{2}{1} = 2,$$

so that according to Fig. 5, $\alpha=30$. When the wave length used was $\lambda=0.5$ m., then the distance $r$ between receiver base point and transmitter base point is:

$$r = \frac{10 \text{ m.} \times 10 \text{ m.} \times 360}{30 \times 0.5 \text{ m.}} = 2.4 \text{ km.}$$

In addition Fig. 5 furnishes the values $\alpha=150$ and $\alpha=210$, for which the respective distances are $r=0.48$ km., and $r=0.343$ km. Where doubt exists as to the actual distance, the measurement can be repeated with another height ratio $p$ or with other heights $h$.

To carry out the method according to the invention, means must, of course, be provided whereby it will be possible to determine the receiving field intensities at different places, and for a definite distance measurement, at the same place, but different heights above sea level.

Now since the heights of the receiver "levels" above the reflecting surface largely depend upon the wave length, it is advisable to use short waves, preferably below the 5 meter length. For the transmitter, ordinarily the place of mounting and the relative height above a plane of reference, such as sea level, will have been fixedly established. The receiver arrangement will generally be of the portable type, and it is just for this reason that it is desirable to accurately determine the distance from the point of reference (transmitter). At the respective place of reception whose distance from the transmitter can be altered as desired, either a single receiver arrangement will be set up whose relative height above the reflecting ground or water surface is variable, or several receivers may be mounted at various heights on a mast $m$, as shown in Fig. 4.

Obviously, the receiver arrangement may be simplified as much as possible as regards its electrical features, thus a single receiver may be provided and connected to an antenna substantially displaceable in the vertical direction, or it may be connected alternatively to antennas arranged in different heights. The receiver apparatus, especially the demodulator stage will be so constructed that the output volume is approximately proportional to the square of the field intensity ($q$), in which case the relationship between ratio ($q^2$) of the receiving volume and the value $\alpha$ from which the distance between transmitter and receiver will be obtained, can be calculated in a simple manner and graphically represented.

I claim:

1. Radio apparatus for measuring distances comprising an energy transmitter and an energy receiver, a plurality of energy collectors disposed substantially at different levels above a datum level, connections between said energy collectors and said receiver, means operable by said receiver for making an indication and means operable in dependence upon the relative field intensities surrounding different ones of said energy collectors for translating the values of the energy collected into terms of distance indications.

2. Apparatus as defined in claim 1 and further characterized by the inclusion of means for indicating a resultant of two field intensities and for translating said resultant into a distance measurement $r$ in conformity with the equation $$r = \frac{2\pi h_1 h_2}{\alpha \lambda}$$

where $h_1$ and $h_2$ are the respective altitudes of the energy collectors above the datum level, $\lambda$ is the wave length of the energy and $\alpha$ is a function of the ratio between the field intensities.

3. Apparatus as defined in claim 1 and further characterized by the inclusion of means for deriving output energies from said receiver proportional to the square of the field intensities surrounding the respective energy collectors.

WILHELM RUNGE.